US006742718B2

(12) United States Patent
Doebler et al.

(10) Patent No.: US 6,742,718 B2
(45) Date of Patent: Jun. 1, 2004

(54) ELECTRIC ROTARY ATOMIZING SYSTEM FOR FLUID APPLICATIONS

(75) Inventors: David S. Doebler, Pineville, PA (US); Timothy M. Harley, Limerick, PA (US)

(73) Assignee: ElectraMist, Inc., Cedars, PA (US)

( * ) Notice: Subject to any disclaimer, the term of this patent is extended or adjusted under 35 U.S.C. 154(b) by 102 days.

(21) Appl. No.: 09/772,160

(22) Filed: Jan. 29, 2001

(65) Prior Publication Data

US 2002/0100815 A1 Aug. 1, 2002

Related U.S. Application Data

(60) Provisional application No. 60/232,726, filed on Sep. 15, 2000.

(51) Int. Cl.[7] .................................... A01G 27/00

(52) U.S. Cl. ............................ 239/67; 239/71; 239/77; 239/147; 239/172

(58) Field of Search ............................ 239/67, 77, 71, 239/380, 68, 146, 147, 172

(56) References Cited

U.S. PATENT DOCUMENTS

| | | | | | |
|---|---|---|---|---|---|
| 3,398,893 | A | * | 8/1968 | Missimer et al. | 239/77 |
| 4,516,723 | A | * | 5/1985 | Hesse | 239/77 |
| 4,542,855 | A | * | 9/1985 | Stacey | 239/690 |
| 4,741,479 | A | * | 5/1988 | Wills et al. | 239/214.25 |
| 5,248,448 | A | * | 9/1993 | Waldron et al. | 516/6 |

OTHER PUBLICATIONS

Product literature for "Pro–Mist MP" ULV sprayer of Beecomist, a division of Clarke Engineering Technologies, Inc., Roselle, IL, 1999, 1 page double–sided.

Product literature for "Pro–Mist HD" ULV sprayer of Beecomist, a division of Clarke Engineering Technologies, Inc., Roselle, IL, 1999, 1 page double–sided.

Product literature for "COUGAR" ULV aerosol generator of Clarke Engineering Technologies, Inc., Roselle, IL, 1998, 1 page double–sided.

Product literature for "1800E" aerosol ULV generator of Clarke Mosquito Control, Roselle, IL, 2000, 1 page double–sided.

Product literature for "MODEL 18–20" ULV aerosol generator of London Fog, Long Lake [Minneapolis], MN, 1 page single–sided.

Product literature for "MINI–PRO" ULV aerosol applicator of Curtis Dyna–Fog Ltd., Westfield, IN, 1 page double–sided.

Product literature for "MAXI–PRO 4" ULV applicator of Curtis Dyna–Fog Ltd., Westfield, IN, 1 page double–sided.

Product literature for "DYNA–JET® L30" ULV applicator of Curtis Dyna–Fog Ltd., Westfield, IN, 1 page single–sided.

(List continued on next page.)

*Primary Examiner*—Christopher Kim
(74) *Attorney, Agent, or Firm*—Drinker Biddle & Reath

(57) ABSTRACT

A control and monitoring system for controlling the rotary atomizer of a sprayer to covert a liquid into atomized droplets which is pumped from a supply. The control and monitoring system includes component control microprocessors connected to a master control microprocessor for monitoring operating parameters of various sprayer components and controlling their operation. A remote controller is connected to the master control microprocessor for alternative manual control over the sprayer by a user or automatic control by the control and monitoring system. The master control microprocessor provides for comparison of monitored operating parameters against acceptable values stored in memory for diagnosis of anomalous operating parameters. A data collector is connected to a data port to access and store operating information processed by the master control microprocessor.

6 Claims, 13 Drawing Sheets

OTHER PUBLICATIONS

Product literature for "MODEL 800 MD Phoenix Fogger" ULV aerosol generator of B&G Chemicals & Equipment Co., Inc., Dallas, Texas, 2000, 1 page double–sided.

Product literature for "MODEL 1800 HD Phoenix Fogger" ULV aerosol generator of B&G Chemicals & Equipment Co., Inc., Dallas, Texas, 2000, 1 page double–sided.

* cited by examiner

ELECTRIC ROTARY ATOMIZING SYSTEM FOR FLUID APPLICATIONS

CROSS REFERENCE TO RELATED APPLICATION

This application claims the benefit of U.S. Provisional Application No. 60/232,726 filed Sep. 15, 2000.

FIELD OF THE INVENTION

The present invention relates to sprayers, and more particularly to an ultra-low volume (ULV) atomizing sprayer and control system.

BACKGROUND OF THE INVENTION

Known in the art of spray equipment are ultra-low volume (ULV) sprayers which convert a liquid into small droplets, typically less than 50 microns in diameter, and rapidly eject the droplets in the form of a fog or cloud. This type of sprayer is frequently used in the application of liquid chemicals, such as insecticides, where the capability of large area coverage provided by the ULV sprayer is highly desirable. In these applications, the ULV sprayers are typically configured for mounting to a spray vehicle, such as a pick-up truck or all terrain vehicle, for operation of the sprayer while the spray vehicle is in motion. To facilitate the distribution of the chemical cloud or fog from the vehicle-mounted sprayer, the discharging portion of the ULV sprayer is typically inclined with respect to a supporting frame or base of the sprayer.

ULV sprayers include sprayers having gas powered engines to power a pump and a blower. The blower delivers pressurized air to a nozzle where the liquid is injected to create an aerosol fog. These sprayers tend to be bulky and heavy, frequently exceeding 40 inches in length and weighing more than 300 pounds with some exceeding 500 pounds. Furthermore, the gas powered engines and blowers of these sprayers are noisy and require substantial maintenance.

Another type of ULV sprayer uses an electric battery to power a rotating atomizing member such as a porous disk, a grooved disk or a mesh screen. In this type of sprayer, a liquid is delivered into the center of the rotating atomizing member and is forced outwardly through the member to be atomized into droplets. The atomized liquid is then expelled from the sprayer by a rapidly moving airstream generated by a fan or blower. The use of an electric power source results in a much quieter machine in contrast to a gas powered machine, particularly where a fan is used instead of a blower as the airstream generator.

The requirement of high rotational speed for the rotating atomizing member has been the source of problems for electric sprayers of the prior art. For example, porous ceramic disks have not proven to be durable and have resulted in dangerously explosive failures. Such deficiencies resulted in the need for protective barriers around the disk to contain fragments from an exploding disk which conflicts with the need for accessibility to the disk for maintenance or replacement. Furthermore, the rotating atomizing members of the prior art have also experienced sealing problems. This results in unatomized fluid leaking from the atomizing member rather than being centrifuged through the atomizing member as intended. What is needed is a quiet and compact electric powered sprayer having a durable atomizing member providing sealed operation at high rotational speeds.

ULV sprayers having a remote control are known in the art. Such devices allow for operation of a vehicle-mounted sprayer, for example, from the cab of the vehicle. Remote control devices of the prior art have provided: gas engine ignition on/off and engine start; pump on/off and spray/flush selection. Prior art remote control devices have also provided for adjustment of the pump flow rate. However, the control provided over the sprayer has been limited to manual adjustment of the sprayer. What is needed is a control system for a ULV sprayer capable of automatically controlling the sprayer for optimal operation of the sprayer. What is further needed is a control system for a ULV sprayer capable of monitoring operating parameters of various system components for diagnosis and reporting of anomalous operating parameters for enhanced operation and maintenance of the sprayer. The monitoring capabilities of the present invention provide for collection of the monitored information by a data collector for storage in a database of sprayer operating information.

SUMMARY OF THE INVENTION

According to the present invention, there is provided a sprayer having an atomizer assembly for converting a liquid into atomized droplets. The atomizer assembly includes an atomizer member, most preferably a porous disk, which is rotated by an atomizer motor to centrifugally atomize liquid delivered internally of the atomizer member. The atomizer assembly further includes an airstream generator, most preferably a motor driven fan, directing an airstream toward the atomizer member. The sprayer further includes a pump for delivering the liquid to the atomizer member from a source of the liquid. A power source is included to supply the power requirements of the atomizer assembly and pump. The sprayer includes a control and monitoring system having component control microprocessors for controlling the operation of various system components, most preferably the pump and the atomizer member. The control over the operation of system components by the control and monitoring system provides for increased efficiencies in sprayer operation.

According to an embodiment of the invention, the sprayer includes a remote controller providing for manual control of the sprayer in which a rate of flow of liquid from the pump may be selected from preset rates or variably adjusted in a range of flow rates by operation of a flow dial. The remote controller also allows for selection of automatic sprayer control in which the master control microprocessor directs the pump control microprocessor to modify the rate of flow from the pump in response to changes in sprayer velocity reported to the master control microprocessor by a velocity monitoring device.

According to one embodiment of the present invention, the control and monitoring system compares monitored information regarding operating parameters of system components against acceptable values stored in memory for diagnosis of anomalous parameters and reporting to the remote controller for display of an error code on a display of the remote controller. The sprayer may further include a data port providing access to the information processed by the control and monitoring system for storage by a data collector.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

DETAILED DESCRIPTION OF THE INVENTION

Figure 1:
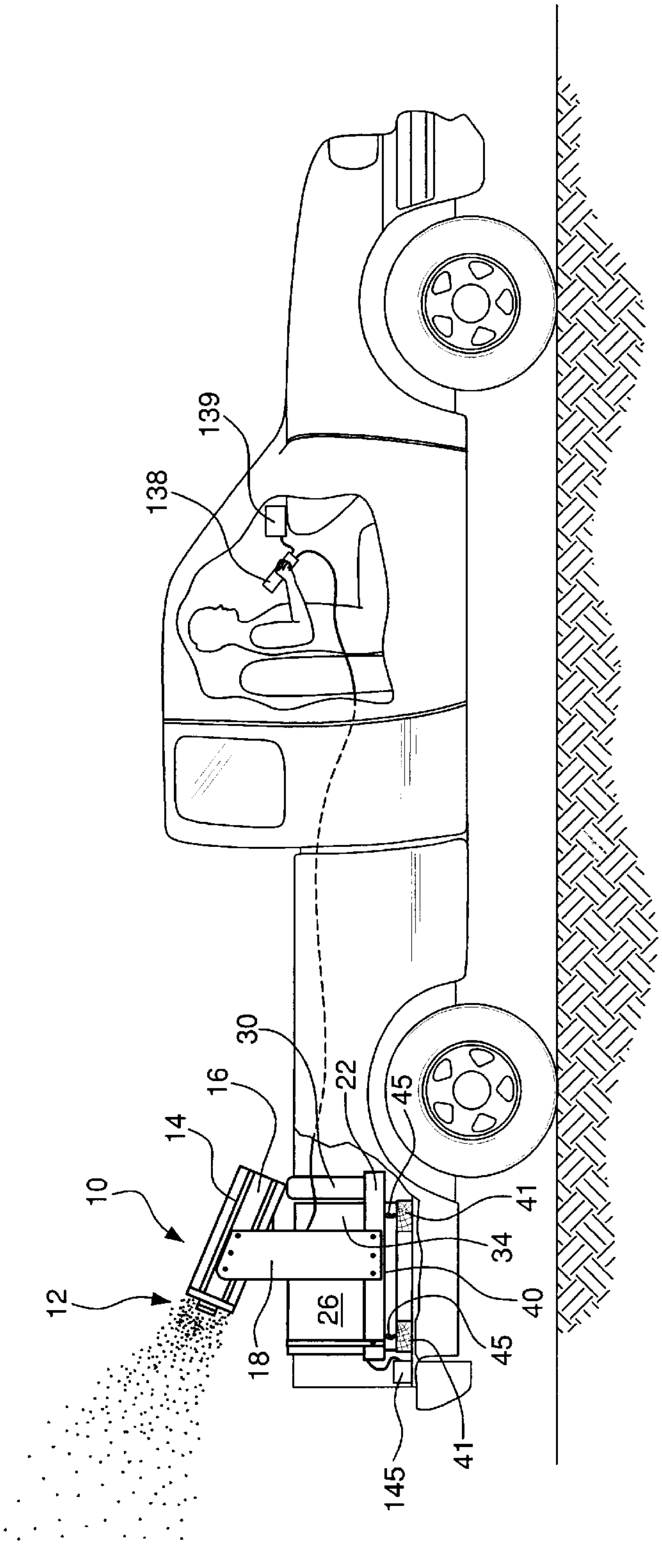
FIG. 1 illustrates a sprayer according to the present invention mounted in the cargo area of a pick-up truck.
Figure 2:
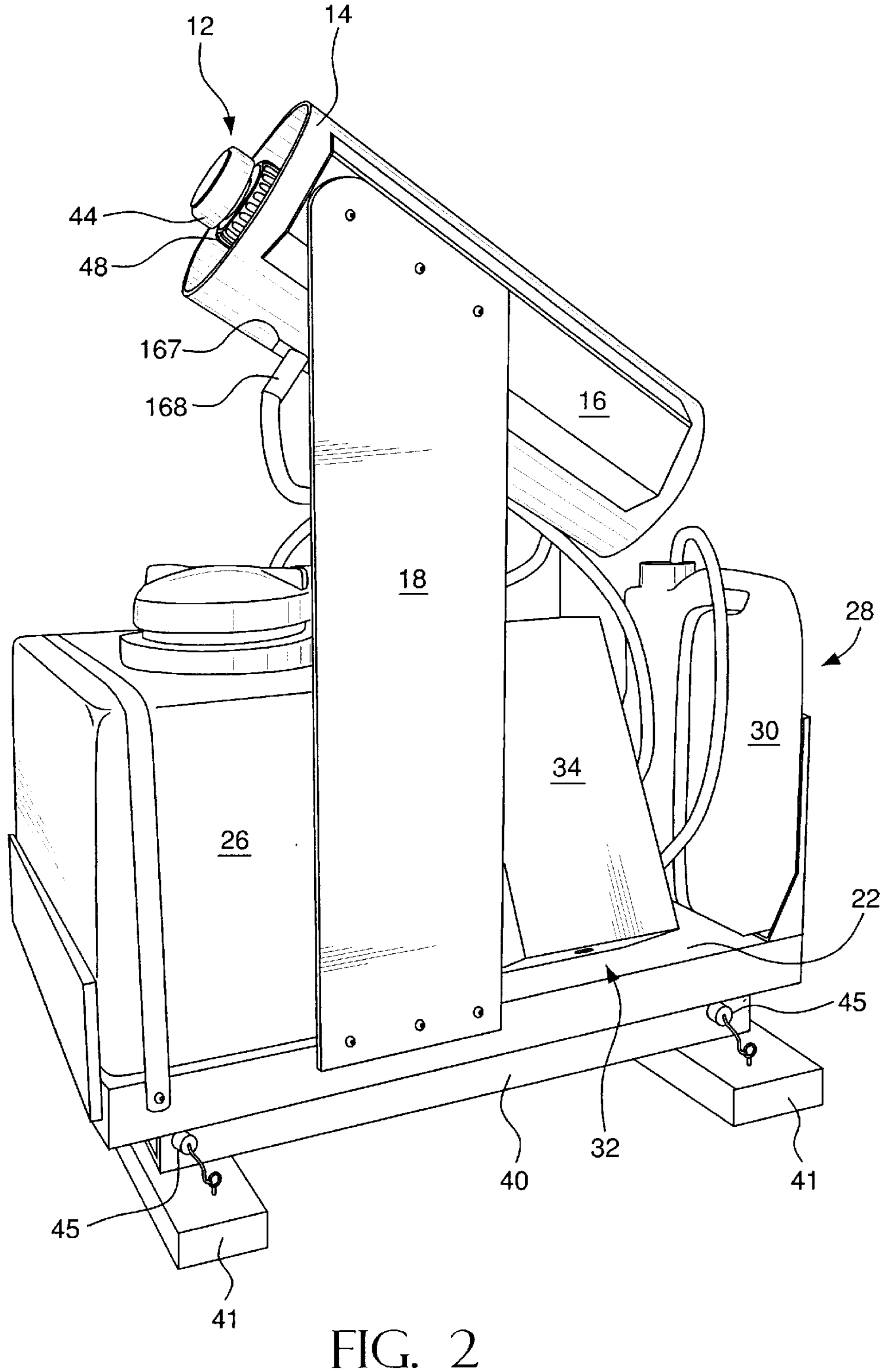
FIG. 2 is a perspective view of a first side of the sprayer of FIG. 1.
Figure 3:
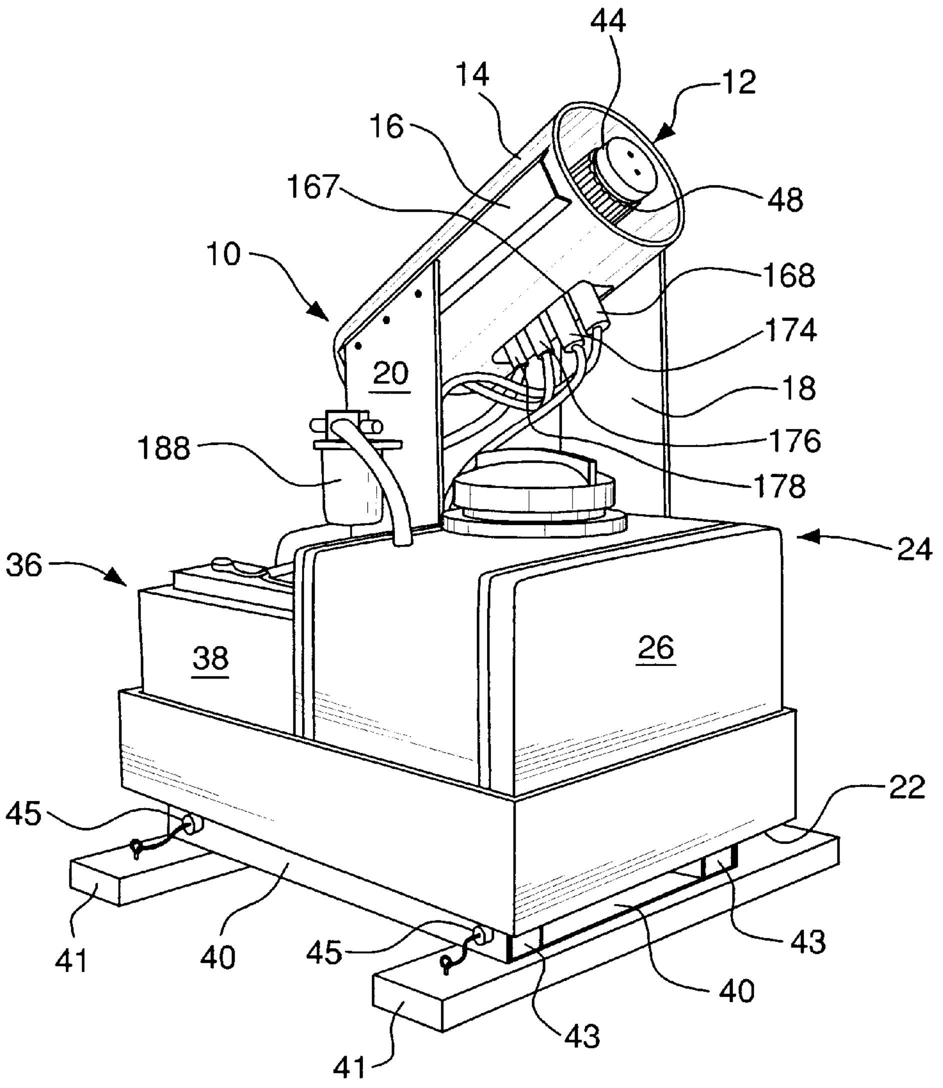
FIG. 3 is a perspective view of a second side of the sprayer of FIG. 1 opposite the first side of FIG. 2.

Referring to the drawings, where like numerals indicate like elements, there is shown in FIGS. 1–3 an ultra-low volume sprayer 10 according to a preferred embodiment of the present invention. For the purpose of illustrating an application of the present invention, the sprayer 10 is shown mounted in the cargo area of a pick-up truck. However, the present invention is not limited to the application shown in FIG. 1. The sprayer 10 includes an atomizer unit 12 which produces a cloud of atomized liquid ejected from the atomizer unit 12 at a high speed. The construction of the atomizer unit of the present invention generates consistently small diameter droplets from an injected liquid. The atomizer unit 12 is housed in a support tube 14 which is secured in an inclined orientation by brackets 16 and support arms 18, 20 on a base 22.

The sprayer 10 includes a chemical system 24 having a tank 26 supported on base 22 for storage of a liquid to provide a source of liquid for the atomizer unit 12. The sprayer also includes a flushing system 28 having a solution container 30 for storage of a flushing solution for periodically cleansing the atomizer unit 12. A pumping system 32 includes a pump 33, best seen in FIG. 11, for delivery of the chemical or a flushing solution to the atomizer unit 12. The pump 33 is contained in a lockable pump box 34.

Referring to FIG. 3, a power system 36 having a battery 38 provides for the power requirements of atomizer unit 12, the pumping system 32, as well as other control and monitor elements to be described in greater detail below. The use of electric power for the power requirements of sprayer 10 result in a much quieter machine in contrast to gas powered ULV sprayers. The use of electric power also reduces maintenance requirements in contrast to the use of gas powered systems.

The sprayer 10 is mounted in a mounting tray 40 which is secured to cross beams 41. As may be seen, the mounting tray 40 is generally U-shaped in section having upstanding side walls. The sprayer 10 includes runners 43 extending beneath the base 22. The runners 43 are spaced from each other such that, when the sprayer 10 is slid into the mounting tray 40, the runners 43 are adjacent to the upstanding side walls of the mounting tray 40. The sprayer 10 is secured to the mounting tray 40 by quick release pins 45 extending through the upstanding walls to engage runners 43. This construction provides for a secure connection yet allows for ready installation and removal of a sprayer. This is useful, for example, where one sprayer is desired to be used on differing vehicles for differing spray runs, i.e. pick-up truck versus all terrain vehicle, or where a particular vehicle has intended use in both a sprayer-configuration and a non-sprayer configuration.

Figure 4:
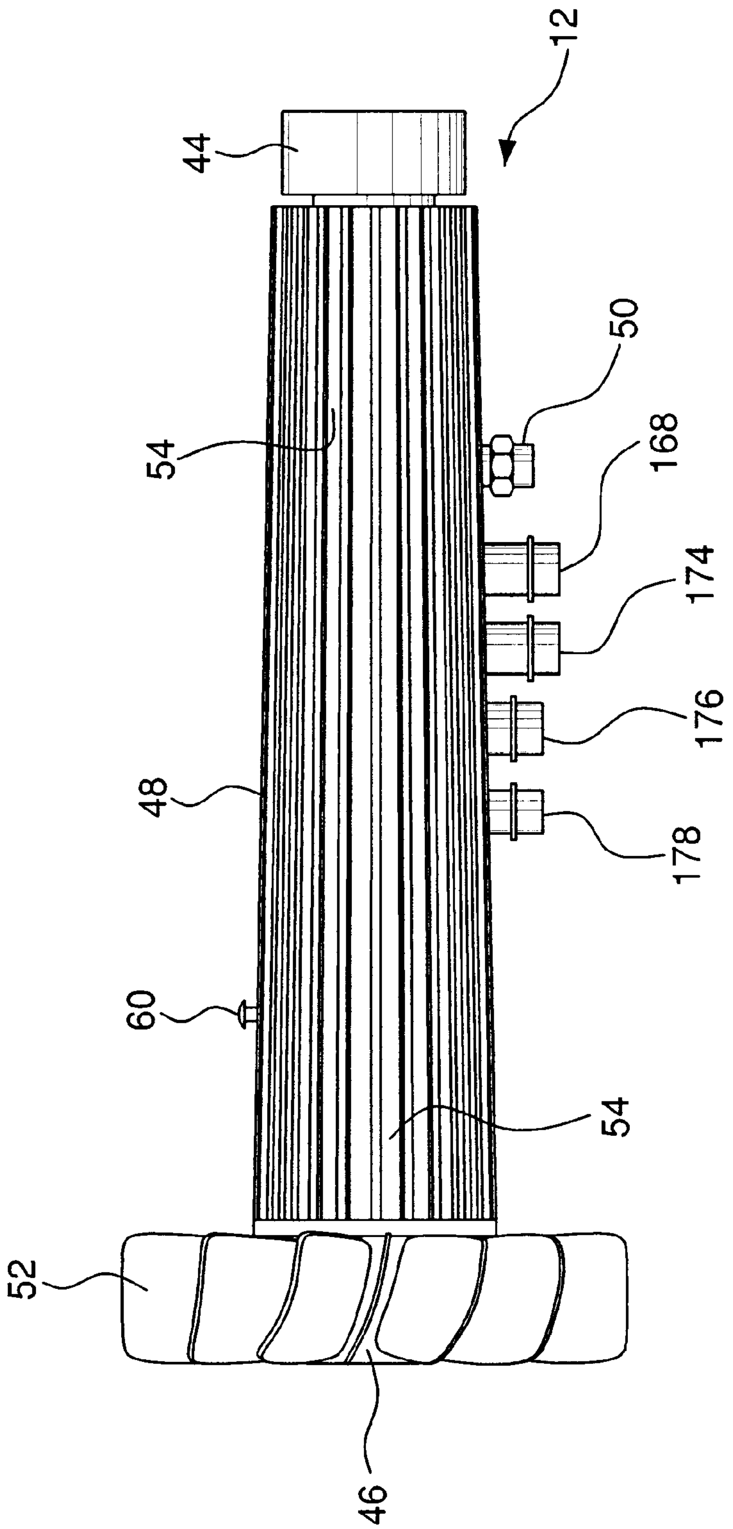
FIG. 4 is a side view of the atomizer unit of the sprayer of FIG. 1 shown removed from the atomizer support tube.

Turning to FIGS. 4–9, the atomizer unit 12 is shown in greater detail. The atomizer unit 12 includes a porous atomizer disk 44 supported adjacent a front end of a housing 48. Liquid is delivered into the housing 48 via fluid inlet 50 and is directed to a sealed interior of the rotating disk 44. The rotation of the disk centrifuges the liquid radially through disk 44. A blade assembly 52 of fan 46 generates an airstream which is directed toward disk 44 in the annular space between housing 48 and tube support 14. As best seen in FIG. 4, the housing 14 tapers inwardly slightly from the fan to the disk and has longitudinally extending grooves 54 in the exterior surface. This construction serves to channel the air stream providing the driving force for high speed ejection of the atomized liquid from the atomizer unit in the form of a cloud.

Figure 5:
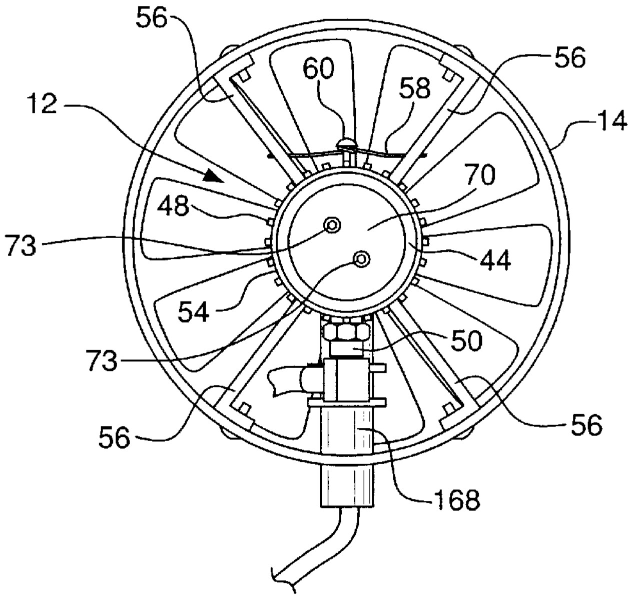
FIG. 5 is an end view of atomizer unit mounted in the atomizer support tube.

Referring to FIG. 5, the atomizer unit 12 is secured within the support tube 14 in the following manner. Each of four evenly spaced mounting fins 56 has a first side positioned in one of the exterior grooves 54 of housing 48 and is bolted to the support tube 14 at an opposite side. A ring portion of a retaining clip 58 is positioned over a bolt 60 extending from housing 48 to secure the housing to fins 56. A fan guard 62 bolted to the lower end of tube support 14 serves to prevent personal injury and blade damage. The support construction for the atomizer unit 12 provides for reliable support while facilitating removal or installation of the atomizer unit if desired.

Figure 6A:
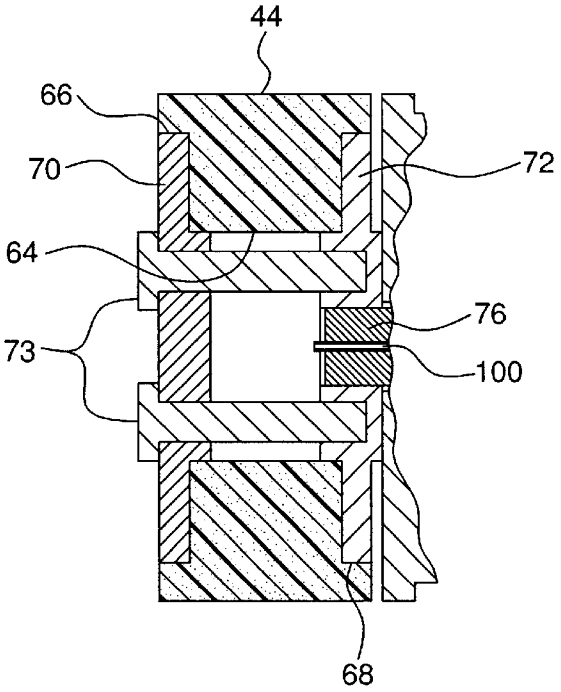
FIG. 6A is a sectional view of a portion of the atomizer unit of FIG. 4.
Figure 6:
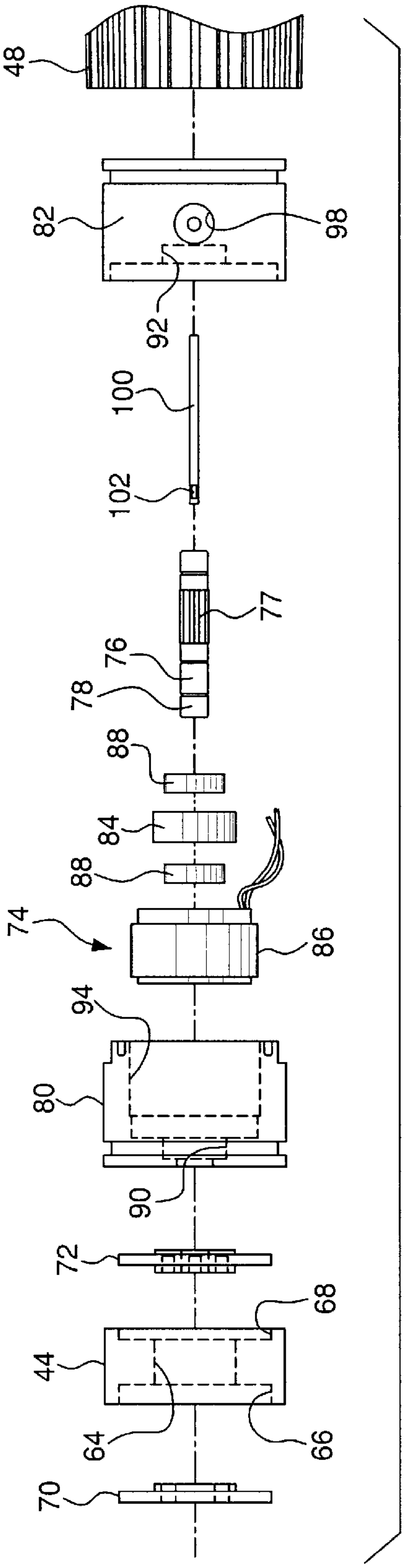
FIG. 6 is an exploded side view of a first end of the atomizer unit of FIG. 4.
Figure 7:
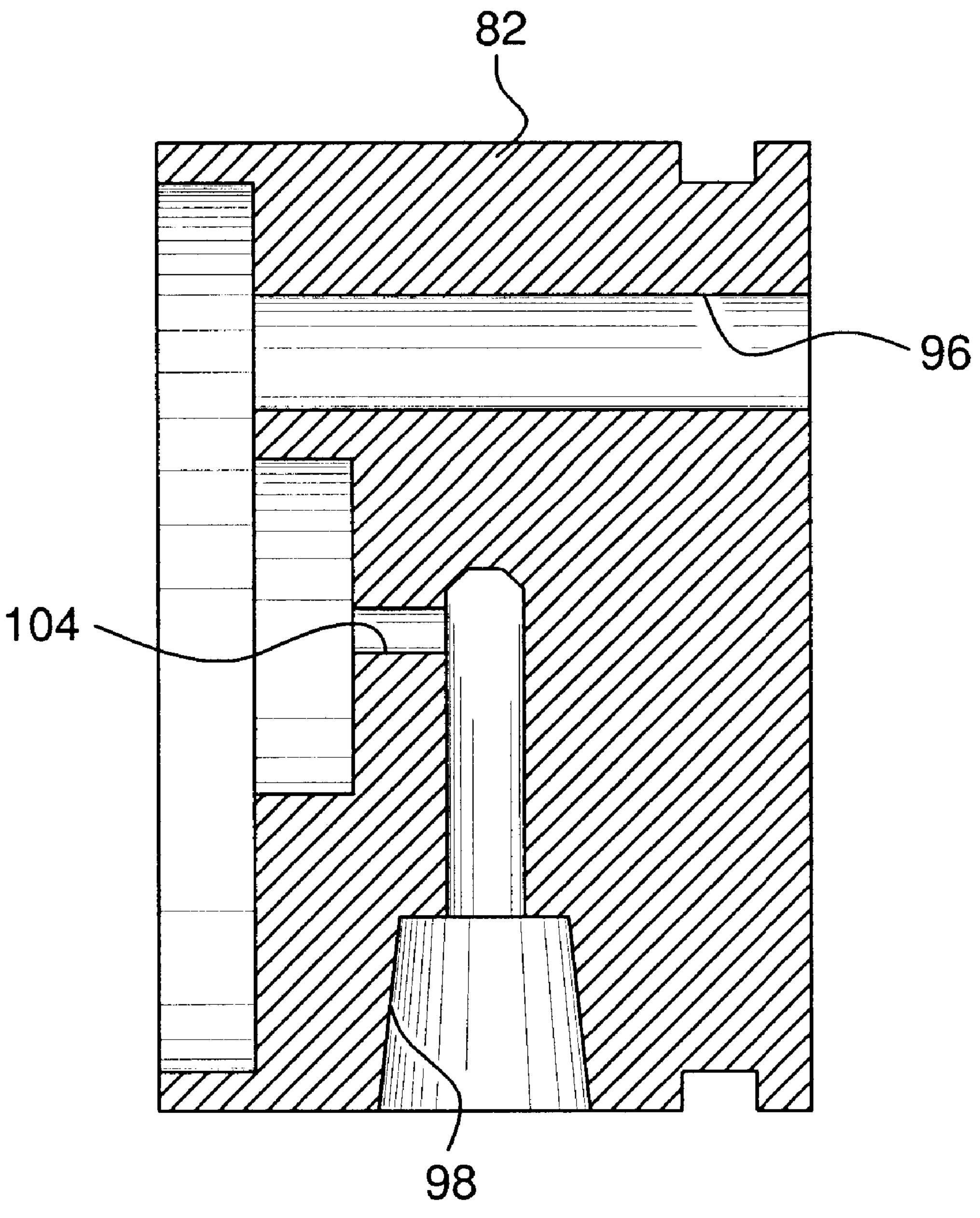
FIG. 7 is a sectional view taken along the lines 7—7 of FIG. 6.

Referring to FIGS. 6, 6A and 7, the atomizing disk 44 includes an internal chamber 64 and front and rear recesses 66, 68, respectively. It has been found that a resin-bonded cellulose material provides a disk having increased durability over ceramic disks of the prior art. A resin-bonded cellulose disk also produces mist droplets which are highly consistent in size. Referring to the sectional view of FIG. 6A, disk 44 is lined to indicate a resin-bonded cellulose material and stippled to indicate that the material is porous. A front disk mount 70 is positioned in the front recess 66 of disk 44 and a rear disk mount 72 is positioned in rear recess 68. The front disk mount 70 is secured to the rear disk mount 72 by bolts 73 extending through disk 44. The opposing disk mounts 70, 72 in their respective recesses 66, 68 enclose the internal chamber 64 creating a sealed chamber in the porous disk 44. The rear disk mount 72 is pressed onto the front end 78 of a motor shaft 76 extending from a atomizing motor assembly 74. The construction of the disk and the supporting mounts provides a balanced configuration facilitating safety and reliability for the rotating disk 44. This construction, however, also provides for ready field replacement of disk 44.

The atomizer motor assembly 74 includes forward and rear housings 80, 82 which are secured together by bolts, not shown. A motor rotor 84 is secured on a knurled portion 77 of shaft 76 and is positioned within a motor stator 86 of a three phase unipolar brushless motor having Hall effect sensors. The construction of the atomizer motor assembly 74 provides for closed loop control of the atomizer motor by the custom designed computer control system of sprayer 10, to be described in greater detail below. A pair of bearing assemblies 88 carried on shaft 76 are positioned in recesses 90, 92 in forward and rear housings 80, 82, respectively, and rotatably support shaft 76 such that rotor 84 is positioned within stator 86 located in cavity 94 of forward housing 80. Opening 96 extending through rear housing 82 provides for passage of motor wiring through rear housing to the motor stator 86 in forward housing 80.

The fluid inlet 50 is secured to an inlet port 98 in rear housing 82 and has a quick release for ready removal from the motor assembly 74. Liquid delivered to the rear housing 82 via inlet 50 enters a feed tube pipette 100 having a first end positioned in hole 104 in rear housing 82. An opposite end of pipette 100 has a slotted opening 102 for delivery of the liquid to the sealed chamber 64 of disk 44. The stationary pipette 100 extends through a central opening, not shown, in rotating shaft 76.

Figure 8:
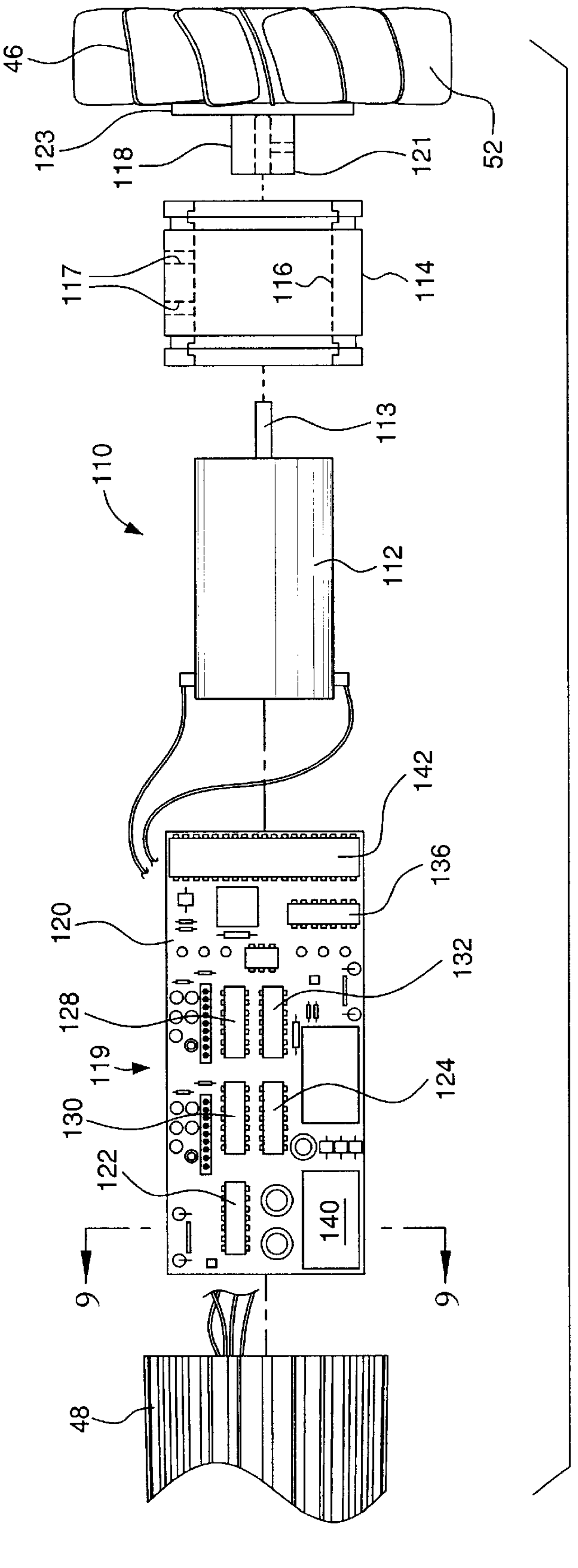
FIG. 8 is an exploded side view of a second end of the atomizer unit of FIG. 4 opposite the first end of FIG. 6.

Referring to FIG. 8, a fan motor assembly 110 for high speed fan 46 is shown to include a fan motor 112 supported in a central opening 116 of a motor housing 114. The fan motor 112 is secured to the motor housing 114 by bolts, not shown, extending through the atomizer housing 48 and through openings 117 in motor housing 114 to engage fan motor 112. This also secures the fan motor housing 114 to the atomizer housing 48. A hub 118 includes a forward portion 121 which is secured to a drive shaft 113 of fan motor 112. The blade assembly 52 of fan 46 is secured to a rear portion 123 of hub 118. The use of an electrically driven fan provides for a high speed airstream directed toward the atomizer disk 44 without the noise of a blower, for example.

Referring to FIG. 8, the sprayer 10 includes a custom designed control and monitoring system 119. The control and monitoring system 119 provides for automatic computer control of system components for optimal management of liquid application. The system 119 also allows for monitoring of the operation of system components and diagnosis of anomalous conditions which facilitates operation and maintenance of the sprayer. Furthermore, the control and monitoring system provides for collection of information relating to sprayer operation for creation of a database of sprayer history.

The control and monitoring system 119 utilizes all microprocessor and solid state construction which is tailored for optimal management of the sprayer. The control and monitoring system of sprayer 10 includes a main system control board 120 which is supported within housing 48 of atomizer unit 12 between the atomizer motor assembly 74 and the fan motor assembly 110. The main system control board 120 provides for control and monitoring of the various components of the present invention as follows. The system control board 120 includes component control microprocessors each of which is capable of operating in either an open-loop or a closed-loop mode to control various system components. The component control microprocessors also provide for monitoring of various operational parameters of the various system components controlled by the microprocessors. The component control microprocessors of the system control board 120 include an atomizer control microprocessor 122. The atomizer control microprocessor utilizes the Hall-effect sensors of the atomizer motor assembly 74 for monitoring motor rotational speed and for closed loop pulse-width modulation (PWM) speed control of the motor assembly 74. The closed loop control capability provides for precision control over the speed of the atomizer motor. The component control microprocessors further include a pump control microprocessor 124 which monitors pump speed measured by a shaft encoder 126 of pump system 32, shown in FIG. 11. The pump control microprocessor 124 utilizes the monitored pump speed for closed loop PWM speed control for precision control of the speed of pump 33. The component control microprocessors further include a fan motor control microprocessor 128 for monitoring the voltage of the brush servo fan motor 112 and open loop PWM voltage control of the fan motor 112. The component control microprocessors of the main system control board 120 also include a valve control microprocessor 132 for open loop PWM voltage control of a solenoid valve 134, shown in FIG. 12, located between pump 33 and tank 26 and flush container 30. The valve 134 provides for selection between the liquid in tank 26 and flush solution in container 30 to be pumped to the atomizer unit 12. It should be noted that the component control microprocessors 128 and 132 for the fan motor and solenoid valve, respectively, although operating in an open-loop mode in the described embodiment are capable of operating in a closed-loop mode.

A spare device control microprocessor 130 is included on the main system control board 120. The spare device microprocessor 130 could be used, for example, in a closed-loop mode to control the operation of a second pump, not shown. The inclusion of a second pump controlled by spare device microprocessor 130 would provide for automatic mixing of liquids from separate sources by the control and monitoring system 119 to produce a chemical mixture or solution for application by the sprayer 10. Also included on the main system control board 120 is a flyback energy power supply 140 for recovery of the PWM switching flyback energy from the coils of system motors or actuators.

Referring again to the schematic of FIG. 1, there is shown a remote controller 138 positioned in the cab of the pick-up truck. The remote controller 138 is connected to the sprayer 10 and provides an interface between the sprayer 10 and a user of the sprayer. As will be described in greater detail, the remote controller 138 provides for manual control over the sprayer 10 or automatic control of the sprayer 10 by the control system of the sprayer. FIG. 1 also shows a data collector 139 connected to the remote controller 138. As will be described in greater detail, the data collector 139 accesses the information processed by the main system control board 120 for creation of a database of information relating to the operation of sprayer components. It is not a requirement that the data collector 139 access the information through the remote controller 138 as shown. The data collector could be linked directly to the main system control board 120 for access to the information processed by the control board.

Figure 9:
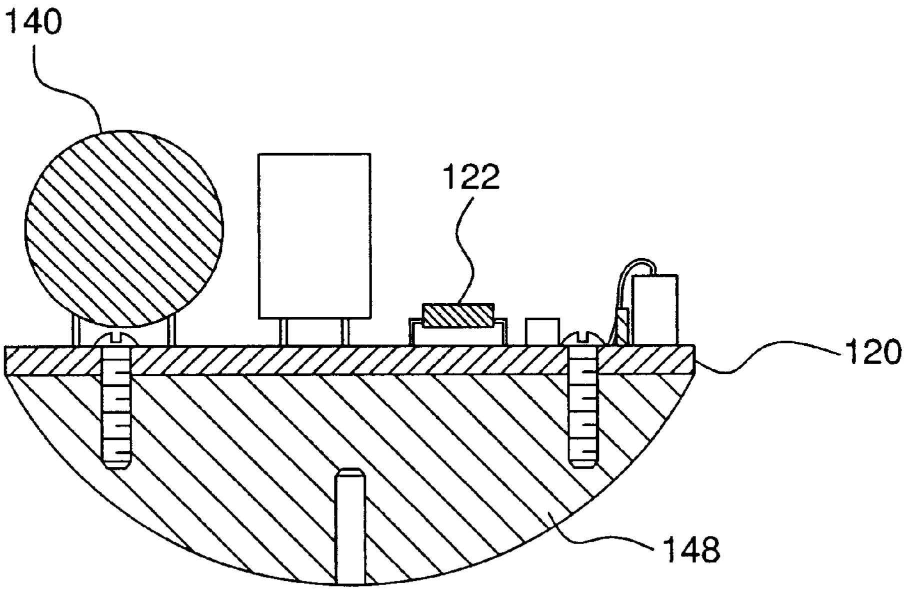
FIG. 9 is a sectional view taken along the lines 9—9 of FIG. 8.

The control and monitoring system 119 includes a master control microprocessor 142 which is connected to each of the component control microprocessors, the battery 38 and a velocity monitoring device 145. The functions of the master control microprocessor include: master communications bus control for other microprocessors of the main system control board 120; pump calibration control; communications processing for remote controller 138 and communications processing with a velocity monitoring device 145 to be described in greater detail. In addition, the master control microprocessor 142 also provides for diagnosis of anomalous operational parameters of sprayer components and reporting for display of error codes by the remote controller 138 to be described in greater detail. As seen in FIG. 9, a heat sink 148 is provided for the main system control board 120 and is secured to system control board 120 opposite the microprocessors.

As shown in FIG. 1, the sprayer 10 incorporates a velocity monitoring device 145 for accurate measurement of the rate of travel of the sprayer 10. In the manner to be described, the main system control board 120 of sprayer 10 utilizes information from the velocity monitor 145 regarding changes in the travel rate of the sprayer 10 to operate the sprayer in a variable flow mode for optimization of chemical application. An example of a suitable device for the velocity monitor 145 is a ground speed sensor. The ground speed sensor would preferably be a non-contact type of sensor which measures ground speed through means unrelated to revolution of a vehicle component, such as a wheel axle. Examples of ground speed sensors suitable for use with sprayer 10 include a sonar sensor or a radar sensor. Such ground speed sensors provide for accurate ground speed measurement at the low vehicle speeds typically associated with operation of the sprayer 10 in the vehicle-mounted configuration of FIG. 1. A ground speed sensor should be suitably mounted with respect to the spray vehicle to facilitate accurate measurement of ground speed. Another example of a suitable velocity monitor 145 is a global positioning system (GPS) receiver. A GPS receiver would provide precise information regarding sprayer velocity to the control and monitoring system 119. The use of a GPS receiver for velocity monitor 145 would also provide for additional precision monitoring by the control and monitoring system 119 of position and course of travel for sprayer 10.

Figure 10A:
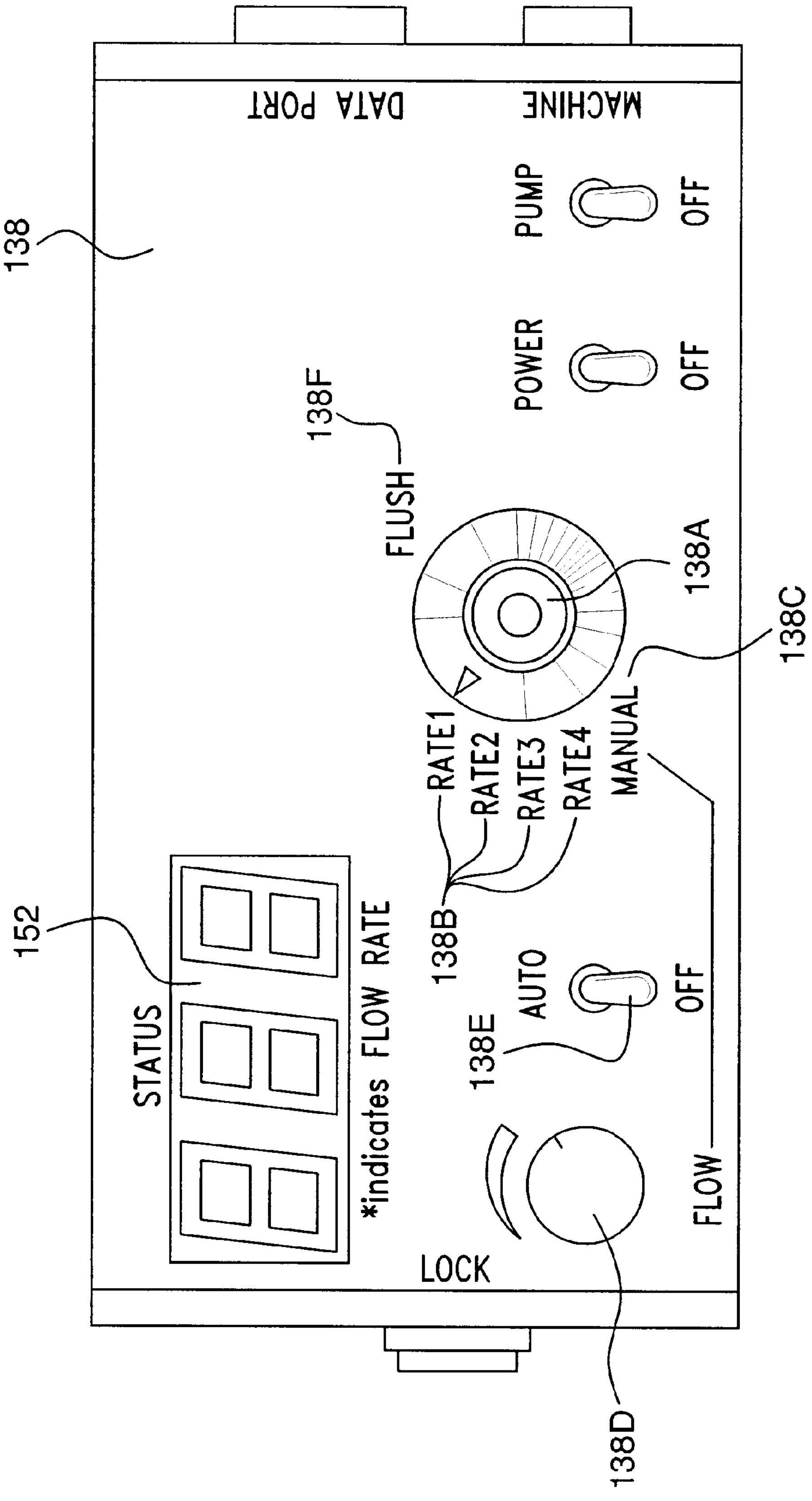
FIG. 10A is a plan view of the remote controller of FIG. 1.
Figure 10B:
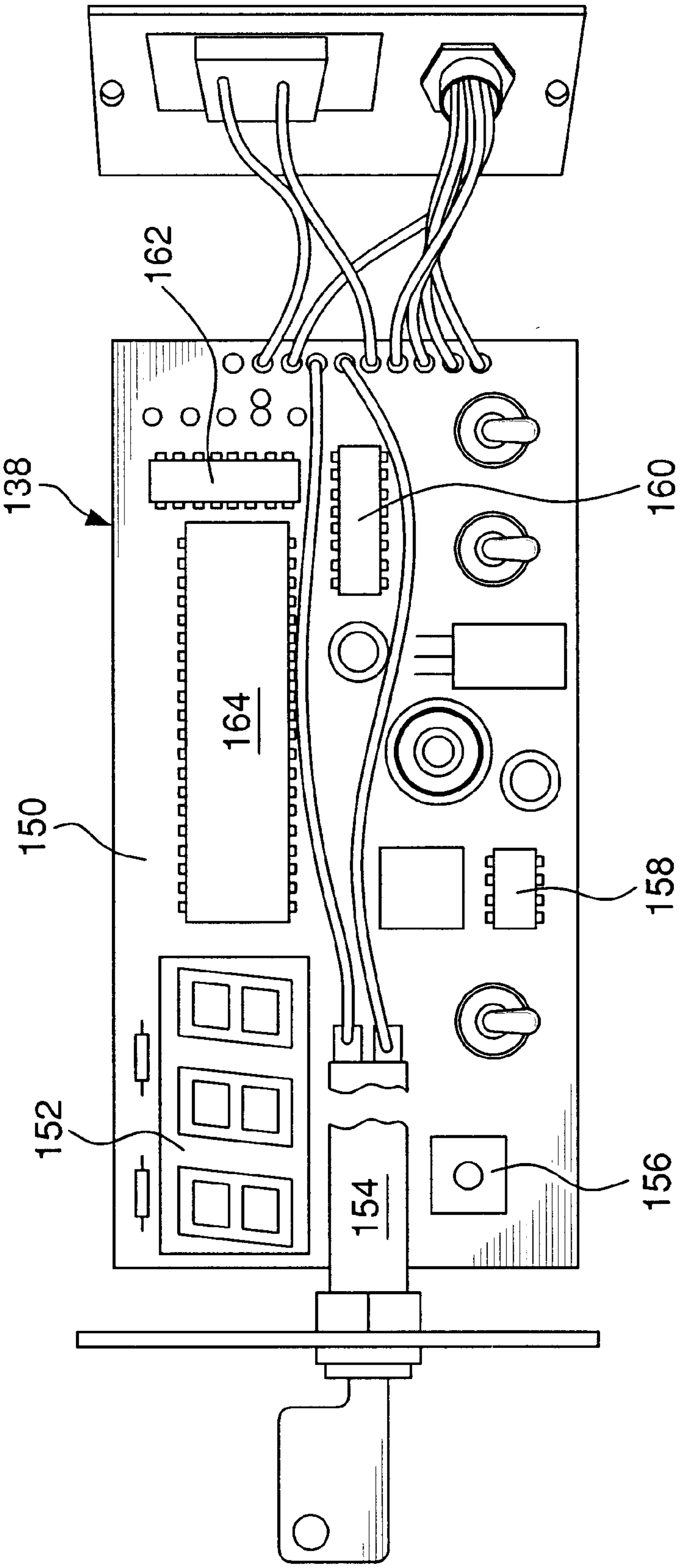
FIG. 10B is a plan view of the remote controller of FIG. 10A with the outer cover removed.

Referring to FIGS. 10A and 10B, the construction of the remote controller 138 is shown in greater detail. The remote controller 138 provides several options for control over the rate of flow for pump 33. Firstly, the pump flow rate may be established by setting a mode selector 138A to one of several preset fixed flow rates 138B. The preset values are stored in memory of the system and can be modified, during recalibration of the pump for example. Alternatively to operation at one of the preset values, the pump may be operated in a variable flow rate mode by setting the mode selector 138A to a manual setting 138C and varying the flow rate within a range of flow rates by turning a flow dial 138D. Furthermore, the control and monitoring system 119 allows for automatic computer control of flow rate by the control and monitoring system 119 in response to changing conditions during a spray run. With the mode selector 138A set to one of the preset values, automatic control over the pump is enabled by activating an auto switch 138E. In this mode, the control and monitoring system 119 responds to changes in sprayer travel rate monitored and reported to the master control microprocessor 142 by a velocity monitoring device 145. The control and monitoring system 119 automatically adjusts the flow rate from the rate previously established by mode selector 138A in accordance with changes in the monitored and reported sprayer travel rate. The remote controller 138 further includes a flush control setting 138F of mode selector switch 138A for actuation of solenoid valve 134 to switch from pumping of liquid from tank 26 to pumping of flush solution from flush container 30.

The remote controller 138 includes a remote control board 150 having a three digit LED display 152 for indicating: pump flow rate; machine hour meter readings; machine function and error codes. A keylock switch 154 provides for selective lock-out of the control settings of the control board 150. A digital encoder 156 provides for manual pump control through operation of the flow dial 138D and for setting of pump flow rates used during calibration, for example. The digital encoder 156 further provides for setting of flow rates of first and second pumps to provide for preset mixture ratios in the event the spare device microprocessor 130 is utilized for closed-loop control of a second pump in the manner described previously. The remote control board 150 includes a static memory integrated chip 158 providing for storage of various sprayer data including pump speed settings, hour meter values and locked out control board settings. The remote control board 150 includes a remote control microprocessor 164 whose functions include: control of LED display 152; interface with memory chip 158; communication with main system control board 120; encoding of input commands of switch 154; decoding of error codes and hour meter count. The remote control board 150 further includes data ports 160, 162 providing access to the communications coming from the main system board 120 to the remote control board 150. The data collector 138 of FIG. 1 is shown connected to the remote controller 138 for access to, and storage of, information relating to sprayer operation. As seen in FIG. 8, the main system control board 120 also includes a data port 136 providing access to the information on sprayer operation monitored by the main system control board 120 of the control and monitoring system 119. This provides for connection of a data collector at the main system board 120 for collection and storage of the data relating to sprayer operation.

The control and monitoring system 119 provides a valuable diagnostic capability for enhanced operation and maintenance of the sprayer 10. The master control microprocessor 142 of the main system control board 120 monitors information relating to component operational parameters which is reported by each of the component control microprocessors and also monitors the voltage of battery 38. The master control microprocessor 142 compares the monitored parameters against acceptable values for the parameters stored in memory of the main system control board. Upon diagnosis of an anomalous operating parameter, the master control microprocessor 142 reports to the remote control board 150 for display of an error code on the LED display 152 of the remote controller 138. Examples of diagnosable sprayer parameters includes: low battery voltage; atomizer speed out of range; pump speed out of range; fan motor or pump motor overload. The control and monitoring system 119 also provides other monitoring and warning capabilities including diagnosis and reporting of lost or impaired component connections.

The data collector 139 includes software which is customized for the collection of the information made available by the monitoring capabilities of the control and monitoring system 119 of the present invention. A suitable data collector is the model OZ-730PC organizer sold by Sharp Electronics Corporation of Mahway, N.J., a division of Sharp Corporation of Japan. However, any data collector providing for the portable collection of the monitored information would be suitable. It is furthermore conceivable that the monitored information could be transmitted directly into a central information database thereby eliminating the need for portable collection of the information. The data collector 139 includes software which is loaded into the data collector and which is customized for the data collection functions of the sprayer of the present invention.

The incorporation of the data collector 139 with the remote controller 138 provides for improved management of chemical applied by sprayer 10 and increased efficiencies. The data collector 139 can be used to record identifying information including: area name, area start date, chemical used, machine serial number, area start date, driver ID, vehicle ID and last pump calibration date. The data collector 139 automatically calculates sprayer information during spraying including: area run time, area run pump output, area run miles sprayed, area run miles sprayed, area run time sprayed, average sprayer travel rate, average flow rate average battery voltage and any error codes generated by the sprayer. In the event the sprayer incorporates a GPS receiver for the velocity monitoring device 145, the data collector also provides for recording of information regarding vehicle location. Furthermore, for a sprayer 10 incorporating a second pump for automatic control over mixing of a chemical mixture or solution, the data collector 139 provides for recording of chemical pump mixture ratios.

The data collector 139 also preferably includes a machine analyzer providing for display by the data collector of: atomizer speed, fan power, pump speed, valve power and battery voltage. The information which is recorded by the data collector 139 during the sprayer operation is uploadable to a computer, such as a PC located at a coordinating office for the sprayer vehicle carrying the sprayer 10, for example. Thus, the information displayed and recorded by the data collector 139 may be used alternatively for real-time adjustment of sprayer 10 in response to changing run conditions or as part of a database of information for various runs for use in optimizing chemical application efficiencies in a spray management system.

The sprayer 10 includes power and control connectors extending through the housing 48 of atomizer unit 12, best seen in FIG. 4. This construction allows for ready connection or removal of power and control cables which extend from the connectors through an opening 167 in tube support 14, best seen in FIG. 3. The connectors include: a power cable connector 168 for connecting the atomizer unit 12 with the battery 38; a line conditioner cable connector 174 for a line conditioner cable for a sprayer breaker and power line filter, not shown; a machine cable connector 176 for a machine cable supplying power to pump 33 and carrying information from pump shaft encoder 126; and a remote control cable connector 178 for connecting the remote controller 138 as seen in FIG. 1.

Figure 11:
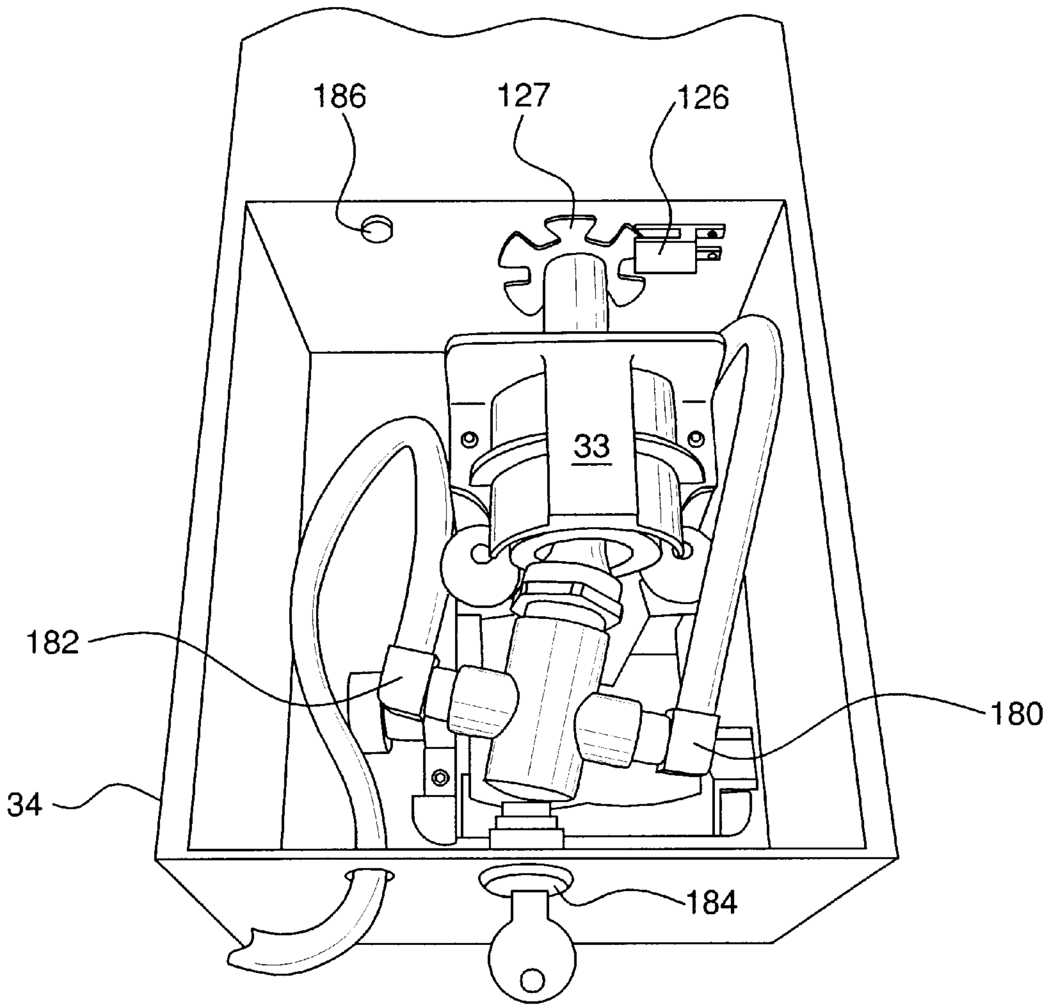
FIG. 11 is a partial elevational view of the sprayer of FIGS. 1–3 showing the pump box with the cover removed.
Figure 12:
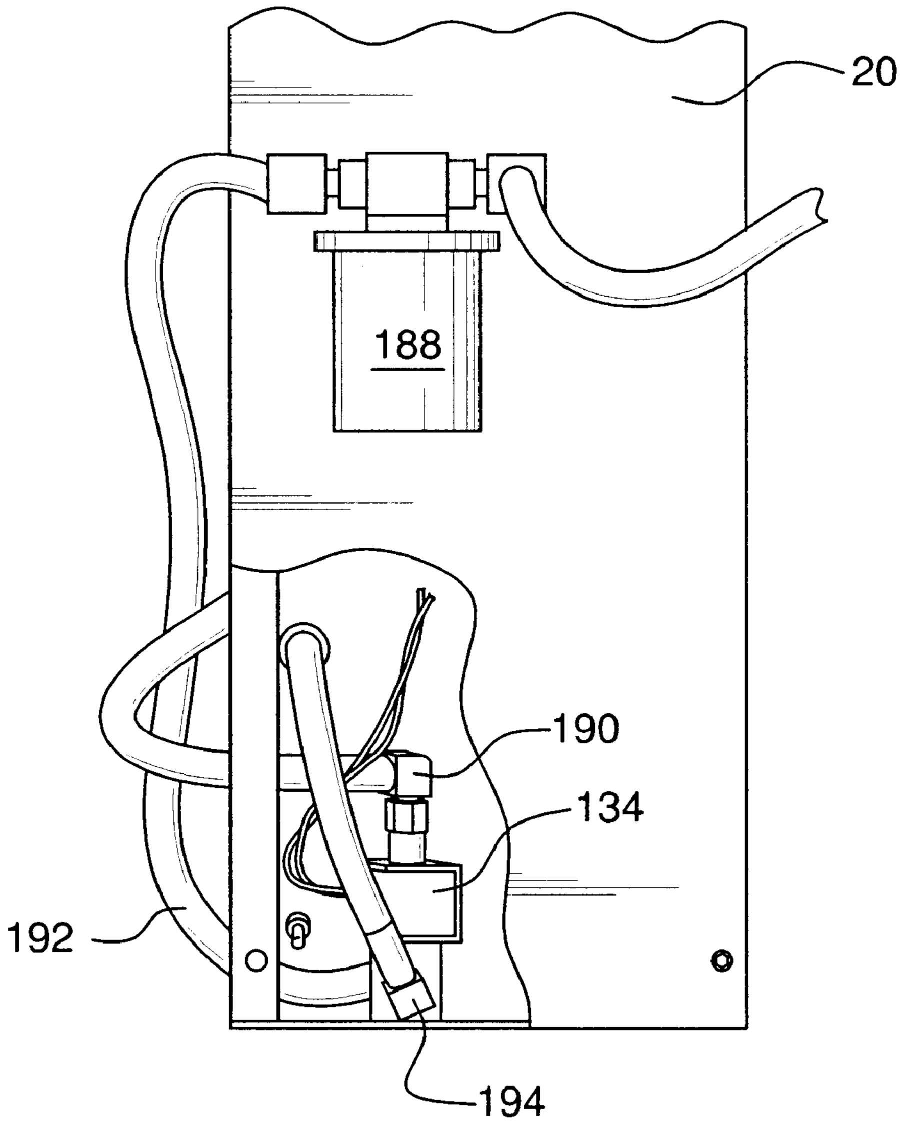
FIG. 12 is a partial elevational view of the sprayer of FIGS. 1–3 opposite the view of FIG. 11 looking toward the rear of the pump box.

Referring to FIGS. 11 and 12, the chemical system 24, flushing system 28 and pumping system 32 are shown in greater detail. The pump 33 of pumping system 32, seen in FIG. 11, is preferably a piston metering pump in which a reciprocating piston doses liquid with each cycle. The shaft encoder 126 provides information regarding the rotational speed of a slotted vane wheel 127 which is secured for rotation with the shaft of pump 33. The information regarding pump speed is necessary for the previously described closed loop operation of the pumping system 32 by the pump control microprocessor 124. Pump inlet fitting 180 and pump outlet fitting 182, respectively, deliver chemical or flush solution to and from the pump 33 depending on the setting controlling the solenoid valve 134. A pump calibration button 186 provides for manual start of a pump calibration cycle which involves timed operation of the pump 33 automatically controlled by the control system of sprayer 10. As seen in FIG. 11, the pump box 34 includes a keylock 184 providing for control over access to the pump and pump calibration button. In the event the sprayer incorporates a second pump for mixture of separate substances to form a chemical mixture or solution in the manner described previously, the pump box could be configured to house both of the pumps or alternatively a second pump box similar to pump box 34 could be used to house the second pump.

Referring to FIG. 12, the chemical system 24 includes a chemical filter 188 for filtering the chemical from the tank 26 prior to delivery of chemical to pump 33. A length of hose 192 connects the chemical filter 188 to a lower end of solenoid valve 134 through an inlet fitting, not shown. Similarly, the flushing solution container 30 is connected by a length of hose to an upper end of solenoid valve 134 through an inlet fitting 190. This construction provides for selective delivery of chemical or flush solution to the pump 33 via valve output fitting 194.

In FIG. 1, the sprayer 10 according to the present invention is shown supported in the cargo area of a pick-up truck for delivery of a liquid chemical. This provides a useful platform for delivery of a liquid chemical, such as an insecticide, over a large area. However, the present invention is not limited to applications in which the sprayer is mounted to a pick-up truck or other utility vehicle for delivery of a chemical. Other fluid applications are conceivable and may include for example incorporation of the sprayer in a track mounted delivery system. The sprayer could also conceivably be supported by a vehicle traveling at a height above ground level for application of a fluid from above.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. A sprayer comprising:

an atomizer assembly comprising a rotatably supported atomizer member including a porous disk having a sealed internal chamber and an atomizer motor operably connected to said atomizer member for rotating said atomizer member to centrifugally convert a liquid into atomized droplets, said atomizer assembly further comprising an airstream generator directing an airstream adjacent to said atomizer member;

a pump operably connected to said atomizing member for delivery of said liquid to said atomizing member from a source of said liquid;

a power supply operably connected to said pump and said atomizer motor; and a control and monitoring system comprising at least one component control microprocessor operably connected to at least one of said atomizer assembly and said pump, said at least one component control microprocessor monitoring and controlling the operation of said at least one of said atomizer assembly and said pump.

2. A sprayer comprising:

an atomizer assembly comprising a rotatably supported atomizer member including and an atomizer motor operably connected to said atomizer member for rotating said atomizer member to centrifugally convert a liquid into atomized droplets, said atomizer assembly further comprising an airstream generator directing an airstream adjacent to said atomizer member, said airstream generator including a fun having a fan motor operably connected to said power supply for powering said fan motor, said fan motor further having a fan blade assembly operably secured to said fan motor for rotation of said fun blade assembly by said fan motor;

a pump operably connected to said atomizing member for delivery of said liquid to said atomizing member from a source of said liquid;

a power supply operably connected to said pump and said atomizer motor; and a control and monitoring system comprising at least one component control microprocessor operably connected to at least one of said atomizer assembly and said pump, said at least one component control microprocessor monitoring and controlling the operation of said at least one of said atomizer assembly and said pump.

3. The sprayer according to claim 2, wherein said atomizer assembly further comprises an elongated housing having opposite first and second ends, said atomizer motor secured to said housing adjacent said first end and said fan motor secured to said housing adjacent said second end, said housing having longitudinally extending channels spaced around an outer periphery and extending between said first and second ends to facilitate the directing of said airstream created by said airstream generator toward said atomizer member.

4. A sprayer comprising:

an atomizer assembly comprising a rotatably supported atomizer member and an atomizer motor operably connected to said atomizer member for rotating said atomizer member to centrifugally convert a liquid into atomized droplets, said atomizer assembly further comprising an airstream generator directing an airstream adjacent to said atomizer member;

a pump operably connected to said atomizing member for delivery of said liquid to said atomizing member from a source of said liquid, said pump including a pump motor providing for a rate of flow of liquid from said pump which is variable;

a power supply operably connected to said pump and said atomizer motor;

a control and monitoring system including a pump control microprocessor operably connected to said pump, said pump control microprocessor controlling the rate of flow of said pump, the control and monitoring system further including a master control microprocessor operably connected to said pump control microprocessor and wherein said sprayer further comprises a velocity monitoring device operably connected to said master control microprocessor, said velocity monitoring device monitoring the rate of travel of said sprayer with respect to ground and reporting the monitored travel rate to said master control microprocessor, said master control microprocessor directing said pump control microprocessor to modify said rate of flow of said pump in response to changes in the sprayer travel rate monitored and reported by said velocity monitoring device; and a remote controller operably connected to said master control microprocessor, said remote controller capable of establishing at least one set rate of flow for said pump which is manually selectable by a user of said remote controller, said remote controller further providing for alternative enablement and disablement of automatic control of said pump by said master control microprocessor in which said master control microprocessor directs said pump control microprocessor to modify the rate of flow of said pump in response to changes in sprayer travel rate monitored and reported by said velocity monitoring device, said remote controller further including a flow control dial for manual variation of the rate of flow of said pump within a range of flow rates.

5. A sprayer comprising:

an atomizer assembly comprising a rotatably supported atomizer member and an atomizer motor operably connected to said atomizer member for rotating said atomizer member to centrifugally convert a liquid into atomized droplets, said atomizer assembly further comprising an airstream generator directing an airstream adjacent to said atomizer member;

a pump operably connected to said atomizing member for delivery of said liquid to said atomizing member from a source of said liquid;

a power supply operably connected to said pump and said atomizer motor; and a control and monitoring system including a pump control microprocessor operably connected to said pump, said pump control microprocessor controlling the operation of at least one operating parameter of said pump and controlling the operation of said pump, said control and monitoring system further including an atomizer control microprocessor operably connected to the atomizer motor of said atomizer assembly, said atomizer control microprocessor monitoring at least one operating parameter of said atomizer motor and controlling the operation of said atomizer motor, said control and monitoring system further including a master control microprocessor operably connected to said component control microprocessors for communication between said master control microprocessor and said component control microprocessors;

a tank for storage of a supply of liquid;

a flush system having a container for storage of a supply of a flushing solution for said atomizer member; and a valve operably connected to said pump and to each of said tank and said container, said valve providing for optional pumping of either one of said liquid and said flushing solution to said atomizer member, said control and monitoring system further comprising a valve control microprocessor operably connected to said valve.

6. A sprayer comprising:

an atomizer assembly comprising a rotatably supported atomizer member and an atomizer motor operably connected to said atomizer member for rotating said atomizer member to centrifugally convert a liquid into atomized droplets, said atomizer assembly further comprising an airstream generator directing an airstream adjacent to said atomizer member;

a pump operably connected to said atomizing member for delivery of said liquid to said atomizing member from a source of said liquid, said pump including a pump motor providing for a rate of flow of liquid from said pump which is variable;

a power supply operably connected to said pump and said atomizer motor; and a control and monitoring system including a pump control microprocessor operably connected to said pump, the pump control microprocessor controlling the rate of flow of said pump, said control and monitoring system further including a spare device microprocessor providing for automatic control by said control and monitoring system over the operation of a second pump and automatic mixing of a chemical mixture of solution.

* * * * *